UNITED STATES PATENT OFFICE.

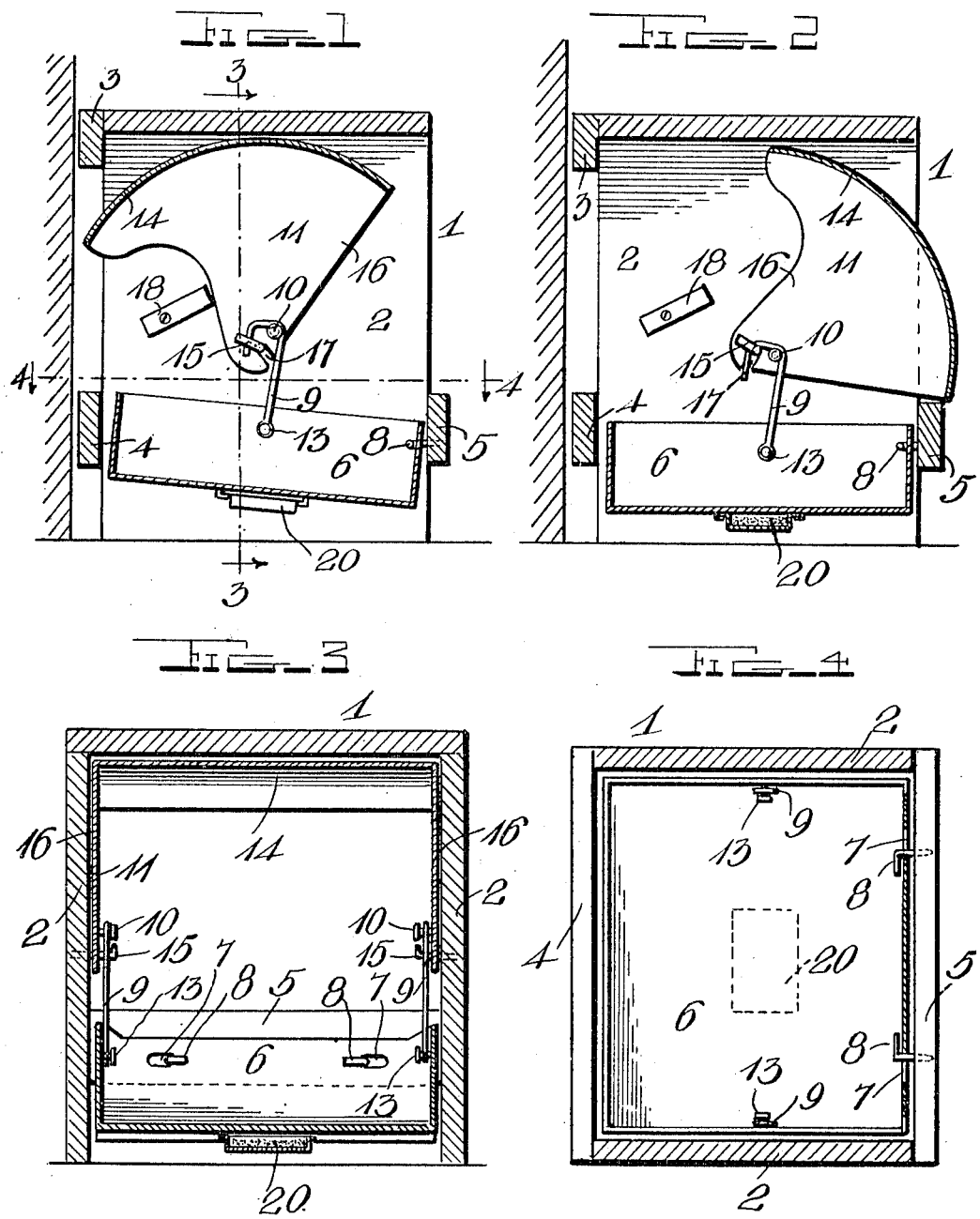

FRANK J. SCHISLER, OF WINTHROP, MINNESOTA.

TRAP-NEST.

950,679.  Specification of Letters Patent.  Patented Mar. 1, 1910.

Application filed June 21, 1909. Serial No. 503,478.

*To all whom it may concern:*

Be it known that I, FRANK J. SCHISLER, a citizen of the United States, residing at Winthrop, in the county of Sibley and State of Minnesota, have invented certain new and useful Improvements in Trap-Nests; and I do declare the following to be a full, clear, and exact description of the invention, such as will enable others skilled in the art to which it appertains to make and use the same.

My invention relates to hens' nests and particularly to that type which are adapted for trapping and retaining setting hens, the object being to keep them upon the nest a pre-determined number of hours during the day.

A further object of the invention is to provide a device of this character which will be simple in construction, adaptable for all sizes and weights of chickens, which may be readily assembled and taken down for purposes of cleaning and which will be perfectly sanitary.

A further object of the invention is the provision of a novel operating link and pivoting device which permits the ready removal of the trap door and which normally locks the trap door and prevents its disengagement with its pivotal points.

With these and other objects in view, the invention consists of certain novel features of construction, combination and arrangement of parts as will be more fully described and particularly pointed out in the appended claims.

In the drawings, Figure 1 is a transverse vertical sectional view showing the trap in position to receive a hen; Fig. 2 is a similar view showing the trap in closed position; Fig. 3 is a vertical longitudinal sectional view on the line 3—3 of Fig. 1; and Fig. 4 is a horizontal sectional view on the line 4—4 of Fig. 1.

Referring more especially to the drawings, 1 represents the box-like frame which supports the nest and a locking jaw to be hereinafter described. The sides of this frame are shown at 2, and are connected together upon their rear edges by longitudinal strips 3 and 4, and on their forward edges by a longitudinal strip 5.

The nest proper is numbered 6 and is preferably of rectangular pan-like formation having separated slots 7, adapted to receive the screw hooks 8, threaded into the connecting strip 5, upon which the pan is pivoted. The rear end of the nest 6, is entirely free of the strip 4 and is supported free of the ground by links 9, arranged on either side of the casing and supported at their upper ends upon the eccentric pins 10, carried upon the lower end of the door 11. The lower ends of the links are adapted to receive the supporting pins 13 carried intermediate the width of the nest. The door 11, has a circular top 14, which is formed on the arc of a circle, the center of which is the pivotal point of the door. This pivotal point consists of screw hooks 15, which are threaded into the sides 2 of the box 1 and are offset from the pins 10, so as to make said pins eccentric to the pivotal point. The sides 16, of the door are slotted as at 17, to receive the pins 15, whereby the same is pivoted within the box and adapted to swing from open to closed position and vice versa. When the door 11 is in closed position its forward edge rests upon the strip 5 and when in open position, the rear edge of its sides rests upon adjustable stops 18, which may be turned to regulate the operation of the door to the weight of the chicken occupying the nest.

The nest being supported in pivotal position by the links 9 and the pins 10, and being offset or eccentric to the pivot pins 15, it will readily be seen that any pressure upon the nest will throw the door to closed position. Thus, when a hen walks in upon the nest, the door closes and she is trapped therein. In order to make the nest perfectly sanitary, I secure a pan 20 to the underside of the nest 6, and fill the same with a disinfectant liquid or powder or with an insecticide as may be found expedient.

From the foregoing description, taken in connection with the accompanying drawings, the construction and operation of the invention will be readily understood without requiring a more extended explanation.

Having thus described my invention, what I claim is:—

1. A trap nest comprising an open casing, a nest pivoted within the casing, a door pivoted in the casing and adapted to close the entrance thereto, links connecting the door to the casing and adapted to operate upon weight being applied to the nest, to close the door, and means upon the links to prevent displacement of the door.

2. A trap nest comprising an open casing, a door removably pivoted within the casing and adapted to close the entrance thereto, a nest pivoted within the casing, links connecting the nest with the door, and overlying hooks on the links adapted to prevent the removal of the door.

3. In a device of the class described, a support, a receptacle pivoted thereto, a door pivoted to the support, and means connecting the door and the receptacle and adapted to operate to close the door, said means adapted to prevent displacement of the door.

4. A trap nest comprising an open casing, a nest pivoted within the casing, a door having slots to engage pivotal points on the casing, pins carried by the door eccentric to the pivotal points, links connecting the nest and the door overlying the pivotal points in engagement with the eccentric pins, whereby when the weight is applied to the nest, the door is thrown to closed position, said overlying portion of the links preventing disengagement of the door from the slots, and means to determine the weight necessary to be applied to the nest to operate the door.

In testimony whereof I have hereunto set my hand in presence of two subscribing witnesses.

FRANK J. SCHISLER.

Witnesses:
  CHAS. W. QUANDT,
  EDWIN SANDERSON.